US010259696B2

(12) United States Patent
Godet et al.

(10) Patent No.: US 10,259,696 B2
(45) Date of Patent: Apr. 16, 2019

(54) MACHINE AND METHOD FOR PROCESSING FILLED CONTAINERS HAVING AN INVERTIBLE DIAPHRAGM

(71) Applicant: SIDEL PARTICIPATIONS, Octeville-sur-Mer (FR)

(72) Inventors: Florian Godet, Octeville-sur-Mer (FR); Vincent Le Guen, Octeville-sur-Mer (FR)

(73) Assignee: SIDEL PARTICIPATIONS, Octeville-sur-Mer (FR)

( * ) Notice: Subject to any disclaimer, the term of this patent is extended or adjusted under 35 U.S.C. 154(b) by 514 days.

(21) Appl. No.: 14/909,811

(22) PCT Filed: Sep. 19, 2013

(86) PCT No.: PCT/EP2013/069534
§ 371 (c)(1),
(2) Date: Feb. 3, 2016

(87) PCT Pub. No.: WO2015/039690
PCT Pub. Date: Mar. 26, 2015

(65) Prior Publication Data
US 2016/0152457 A1 Jun. 2, 2016

(51) Int. Cl.
*B67C 3/04* (2006.01)
*B67C 3/00* (2006.01)
(Continued)

(52) U.S. Cl.
CPC .............. *B67C 3/045* (2013.01); *B67C 3/007* (2013.01); *G01L 3/108* (2013.01); *B67C 2003/226* (2013.01)

(58) Field of Classification Search
CPC ... B67C 2003/226; B67C 3/007; B67C 3/045; B67C 3/222; B67C 3/223; B67C 3/244;
(Continued)

(56) References Cited

U.S. PATENT DOCUMENTS 4,459,843 A * 7/1984 Durham .............. G01M 3/3236
73/37
4,967,538 A * 11/1990 Leftault, Jr. ......... B65D 79/005
53/426
(Continued)

FOREIGN PATENT DOCUMENTS

WO 2005/012091 A2 2/2005

OTHER PUBLICATIONS

International Search Report, dated Mar. 19, 2014, from corresponding PCT application.

*Primary Examiner* — Andrew M Tecco
*Assistant Examiner* — Nicholas Igbokwe
(74) *Attorney, Agent, or Firm* — Young & Thompson

(57) ABSTRACT

Machine (18, 19) for processing containers (1) including a base (7) having a high standing ring (8) and a central invertible diaphragm (9), the machine (18, 19) including:
a container supporting frame (20) including a hollow support ring (21) for engaging a container base (7),
a pusher (26) movable with respect of the container supporting frame (20), capable of coming into abutment with the container base (7) through the supporting frame (20),
an actuator (28) for slidingly moving the pusher (26) frontwards towards the container base (7) through the supporting frame (20), and backwards,
a strain gauge (29) coupled to the actuator (28) for gauging a strain applied by the actuator (28) to the pusher (26),
a control unit (30) including a processor (32) connected to the strain gauge (29) and programmed for comparing a gauged strain value to a memorized strain reference value.

15 Claims, 3 Drawing Sheets

(51) Int. Cl.
*G01L 3/10* (2006.01)
*B67C 3/22* (2006.01)

(58) Field of Classification Search
CPC ......... B67C 7/00; G01L 3/108; B65D 1/0276; B65D 1/0284; B65D 79/005
USPC ......... 53/440, 471, 281–282, 75–76; 73/862, 73/719; 29/593–594
See application file for complete search history.

(56) References Cited

U.S. PATENT DOCUMENTS

| | | | | |
|---|---|---|---|---|
| 5,090,180 | A * | 2/1992 | Sorensen | B29C 51/00 53/281 |
| 5,205,047 | A * | 4/1993 | Danielli | G01B 7/13 33/542 |
| 7,726,106 | B2 * | 6/2010 | Kelley | B65B 21/12 53/290 |
| 2004/0211746 | A1 * | 10/2004 | Trude | B65D 1/0276 215/374 |
| 2006/0231985 | A1 * | 10/2006 | Kelley | B29C 49/4802 264/523 |
| 2008/0047964 | A1 | 2/2008 | Denner et al. | |
| 2009/0218003 | A1 * | 9/2009 | Miyazaki | B65D 1/0276 141/4 |
| 2009/0293436 | A1 * | 12/2009 | Miyazaki | B65D 1/0261 53/471 |
| 2010/0163513 | A1 * | 7/2010 | Pedmo | B65D 1/0276 215/370 |
| 2010/0199611 | A1 * | 8/2010 | Pedmo | B65B 61/24 53/467 |
| 2011/0017345 | A1 * | 1/2011 | Monzel | B67C 3/30 141/1 |
| 2011/0049083 | A1 * | 3/2011 | Scott | B65D 1/0276 215/371 |
| 2011/0239788 | A1 * | 10/2011 | Nagasaka | B25J 13/085 73/862.338 |
| 2012/0152964 | A1 * | 6/2012 | Kelley | B65B 21/12 220/635 |
| 2014/0109517 | A1 * | 4/2014 | Melrose | B65B 7/2835 53/440 |

* cited by examiner

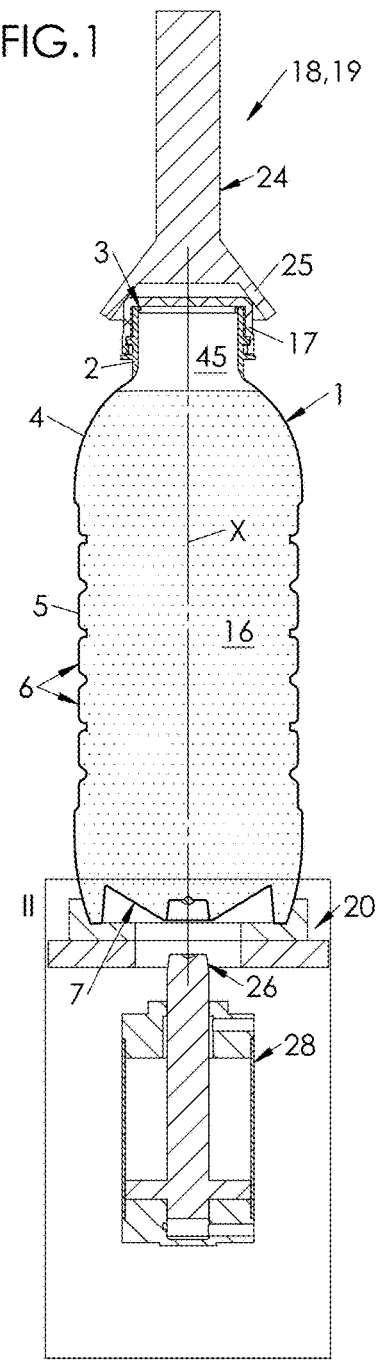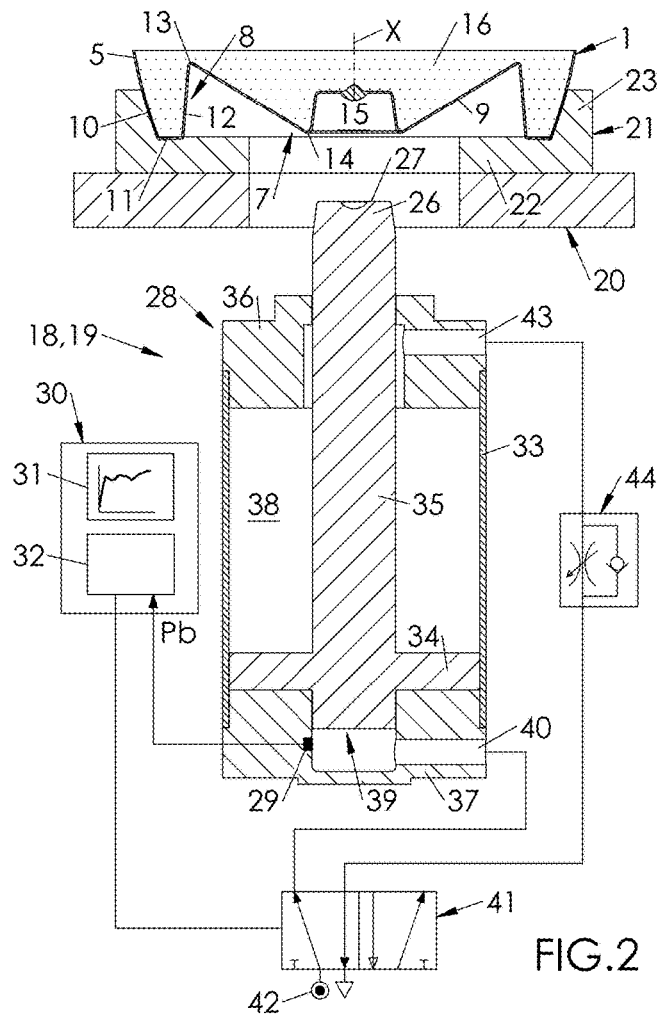

MACHINE AND METHOD FOR PROCESSING FILLED CONTAINERS HAVING AN INVERTIBLE DIAPHRAGM

FIELD OF THE INVENTION

The invention generally relates to the processing of containers, such as bottles, which are produced by blow molding or stretch-blow molding from preforms made of plastic (mostly thermoplastic, e.g. PET) material. More specifically but not exclusively, the invention relates to the processing of hot-fill containers, i.e. containers filled with a hot pourable product (typically a liquid), the term "hot" meaning that the temperature of the product is higher than the glass transition temperature of the material in which the container is made. Typically, hot filling of PET containers (the glass transition temperature of which is of about 80° C.) is conducted with products at a temperature comprised between about 85° C. and about 100° C., typically at 90° C.

BACKGROUND OF THE INVENTION

Bi-orientation undergone by the container during its blow molding induces residual stresses in the material. Such residual stresses are released during hot-filling, causing a deformation of the container that might make it unsuitable for use—and hence for sale.

In order to decrease deformation of the container during hot-filling, it is known to heat set the container, whereby the blow molding is conducted within a mold provided with sidewalls heated at a predetermined temperature between 80° C. and 180° C., and the container is held against the sidewalls at the end of the blow molding for a predetermined time (generally several seconds).

However, heat setting solves only part of the problems of deformation of a hot-fill container. Indeed, while cooling, the product and the air above the liquid in the capped container undergo a decrease in volume that tends to make the container retract.

Several solutions have been considered for decreasing the visible effects of such retraction. These solutions generally concern the shape of the container.

For example, it has been proposed to equip the body of the container with deformable side panels that bend inwards under the effect of the retraction and bend back outwards when the container is opened. Such containers must be handled with care by the user because of the flexibility of the body, which may result in accidental spraying.

U.S. Pat. Appl. No. 2008/0047964 (Denner et al, assigned to CO2PAC) discloses a container comprising a pressure panel located in the bottom portion of the container.

According to Denner, the pressure panel is movable between an outwardly-inclined position and an inwardly-inclined position to compensate for a change of pressure inside the container. In order to alleviate all or a portion of the vacuum forces within the container, the pressure panel is moved from the outwardly-inclined position by a mechanical pusher after the container has been capped and cooled, in order to force the pressure panel into the inwardly-inclined position. The inversion of the pressure panel from the outwardly-inclined position to the inwardly-inclined position reduces the internal volume of the container.

However, Denner fails to address the problem of badly (either over—or insufficiently) filled containers, along with the problem of cap leakage. Such problems frequently arise with hot filling, wherein the air volume (also called headspace) between the product and the cap undergoes important variations of pressure. In particular, air pressure in the headspace during inversion of the pressure panel might exceed the sealing capability of the cap and thereby lead to undesired air leaks.

SUMMARY OF THE INVENTION

It is an object of the invention to provide a method for processing containers decreasing the risk of badly filled containers.

It is another object of the invention to provide a method for processing containers which allows detecting an improper filling, or a leakage in the cap.

It is therefore provided, in a first aspect, a method for processing a container provided with:
a sidewall,
a neck defining an opening,
and a base including a high standing ring and a central invertible diaphragm, said diaphragm being deformable with respect of the sidewall between an lower position wherein said diaphragm projects outwardly with respect of the container and an upper position wherein said diaphragm projects inwardly with respect of the container,
said method including the steps of:
filling the container through said opening with a pourable product, the diaphragm being in its lower position;
closing the container at its neck with a cap;
inverting the diaphragm from its lower position to its upper position by means of a movable pusher;
gauging a strain applied to the movable pusher while inverting the diaphragm;
memorizing a gauge point based on the gauged strain value;
comparing the gauged point to a memorized predetermined reference point.

In a preferred embodiment, the following steps are provided:
periodically (with a period preferably shorter than 10 ms) gauging the strain applied to the movable pusher along the diaphragm inversion,
memorizing the such gauged strain values.

The method may further include the step of detecting, among the memorized gauged points, a gauged critical point.

Comparing the gauged critical point may include comparing a gauged critical strain value to a predetermined critical reference strain value and/or comparing a gauged critical instant to a predetermined reference critical instant.

A step of generating a warning signal if the gauged strain value is declared different from the reference strain value, may also be provided.

In an alternate or combined embodiment, a step of ejecting the container if the gauged strain value is declared different from the reference strain value may be provided.

In a possible architecture where the pusher is mounted onto a movable rod of a hydraulic or pneumatic cylinder, where the rod is fixed to a piston which defines within the cylinder a front chamber around the rod and a back chamber opposite to the rod, and where said back chamber is in fluidic connection with a source of fluid under pressure, the step of determining the effective strain applied to the pusher may comprise measuring a fluidic pressure within the back chamber.

In addition, the method may comprise a step of filling the container with a hot pourable product, and further include, between the steps of closing the container and inverting the diaphragm, a step of cooling the container.

A step of gauging a displacement of the pusher may also be provided.

It is provided, in a second aspect, a machine for processing containers each including:
a sidewall,
a neck defining an opening,
and a base including a high standing ring and a central invertible diaphragm, said diaphragm being deformable with respect of the sidewall between an lower position wherein said diaphragm projects outwardly with respect of the container and an upper position wherein said diaphragm projects inwardly with respect of the container,
wherein said machine includes:
a container supporting frame including a hollow support ring for engaging a container base,
a pusher movable with respect of the container supporting frame, capable of coming into abutment with the container base through the supporting frame,
an actuator for slidingly moving the pusher frontwards towards the container base through the supporting frame, and backwards,
a strain gauge coupled to the actuator for gauging a strain applied by the actuator to the pusher,
a control unit comprising a memory including a predetermined strain reference value, and a processor connected to said strain gauge and programmed for comparing a gauged strain value to the memorized strain reference value.

The actuator is for example a hydraulic or pneumatic cylinder including a cylinder housing, a piston and a rod fixed to the piston, and the pusher is mounted onto the rod.

In a preferred embodiment, the piston defines within the cylinder a front chamber around the rod and a back chamber opposite to the rod, and the gauge is a pressure gauge mounted in the cylinder and opening in the back chamber.

In an alternate embodiment, the actuator is an electric or magnetic actuator, and wherein the gauge is a torque sensor.

The above and other objects and advantages of the invention will become apparent from the detailed description of preferred embodiments, considered in conjunction with the accompanying drawings.

BRIEF DESCRIPTION OF THE DRAWINGS

FIG. 1 is a partial cut view showing a machine for processing containers, including a pusher for inverting a diaphragm provided on a container base.

FIG. 2 is an enlarged detailed view showing the machine of FIG. 1, in a state preceding an inversion of the diaphragm.

DETAILED DESCRIPTION

Figure 4:
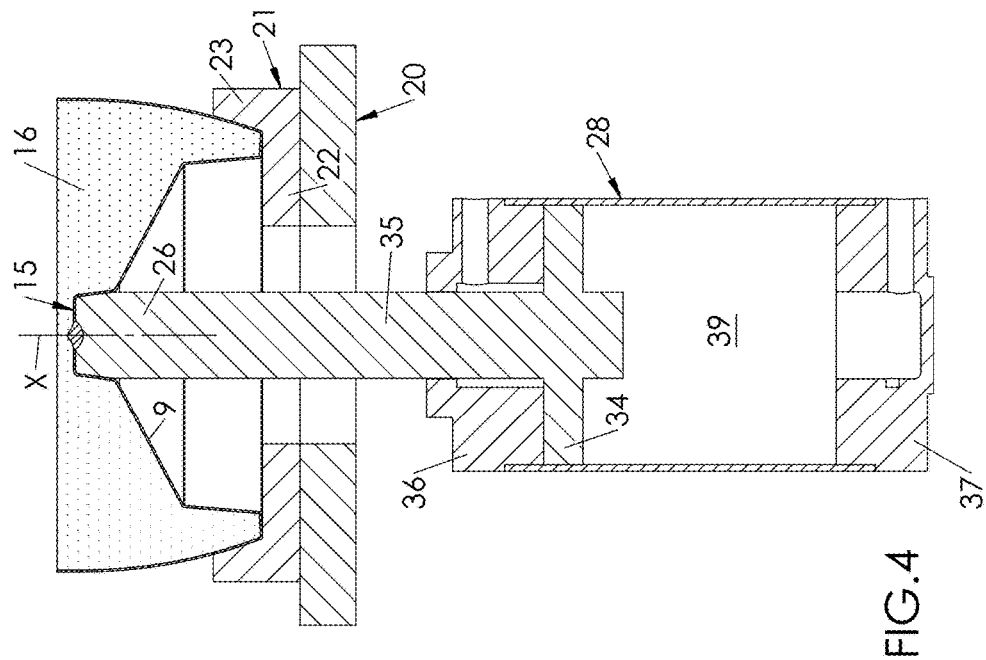
FIG. 4 is a view similar to FIG. 2 and FIG. 3, showing the machine in a state where inversion of the diaphragm is complete.

Shown on FIG. 1 is a container 1 made by blow molding or stretch blow molding from a preform made of plastic such as PET. In a preferred though not exclusive embodiment, the container 1 is a hot-fill container, i.e. it has undergone, during the blow molding process, a heat set phase in order to increase the resistance of the container 1 to thermal stresses undergone during a filling step with a hot product, "hot" meaning that the temperature of the product is higher than the glass transition temperature of the material. In the case of PET, which has a glass transition temperature of about 80° C., the hot pourable product has for example a filling temperature in a range of about 85-95° C. Examples of hot pourable liquid products include (but are not limited to) tea, fruit juices, sports drinks.

The container 1 includes an open cylindrical threaded upper portion or neck 2, which terminates, at an upper end thereof, by an opening our mouth 3. Below the neck 2, the container 1 includes a shoulder 4 of increasing diameter in a direction opposite to the neck 2.

Below the shoulder 4, the container 1 has a sidewall 5 which is substantially cylindrical around a container main axis X. The sidewall 5 may, as depicted in FIG. 1, include annular stiffening ribs 6 capable of resisting thermal and mechanical stresses undergone by the container 1 during filling, capping and subsequent handling.

At a lower end of the sidewall 5, the container 1 has a base 7 which closes the container 1 and allows it to be normally put on a planar surface such as a table when used by a final customer.

The container base 7 includes a standing ring 8, which is a high standing ring as it will be explained later, and a central invertible diaphragm 9, which is deformable with respect of the sidewall 5 between an lower position shown on FIG. 1-3, wherein the diaphragm 9 projects outwardly with respect of the container 1, and an upper position, shown on FIG. 4, wherein the diaphragm 9 projects inwardly with respect of the container 1.

The container 1 is blow molded with the diaphragm 9 in its lower position shown in FIG. 1. As will be explained in further details below, the diaphragm 9 is capable of being mechanically forced upwards (i.e. inwards with respect of the container 1) after the container 1 has been filled with a pourable product, capped and cooled down, in order to compensate for the vacuum generated by the cooling of the product and to increase the overall rigidity of the filled container 1, for the benefits of container handling and customer quality perception.

The standing ring 8 connects to the sidewall 5 of the container at a lower end portion 10 thereof. The standing ring 8 has a support flange 11 adjacent and substantially perpendicular to the lower end portion 10 of the sidewall 5, and a cylindrical or frustoconical inner portion 11 which connects the support flange 11 to the diaphragm 9.

Figure 3:
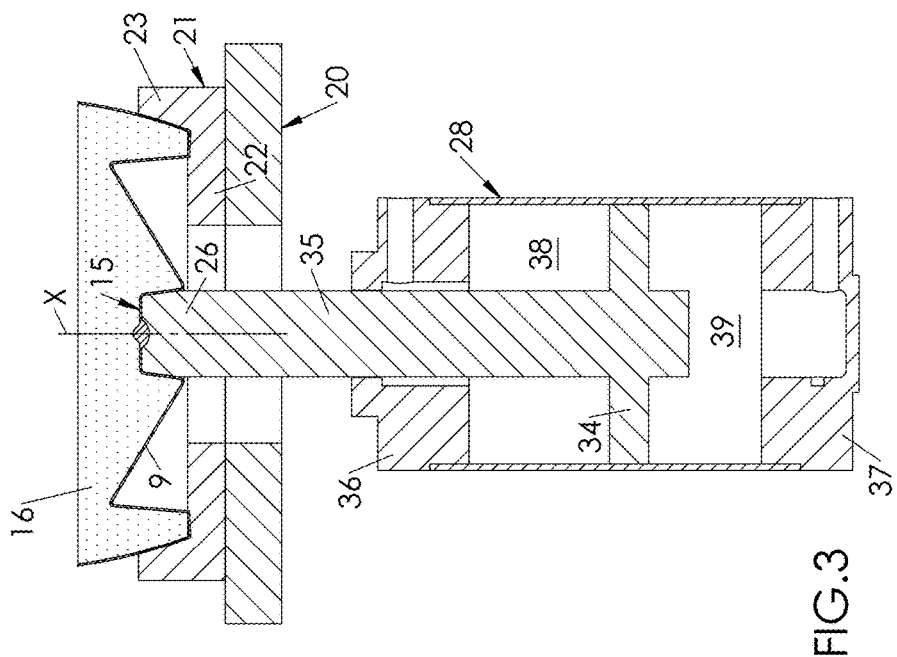
FIG. 3 is a view similar to FIG. 2, showing the machine during inversion of the diaphragm.

In a preferred embodiment, the lower end portion 10 of the wall portion 5 has, when viewed in transversal section as shown on FIG. 3, the shape of an arch with a concavity turned inward with respect of the container 1, whereby the outer diameter of the support flange 11 is smaller than the overall diameter of the wall portion 5.

As depicted, the inner portion 12 preferably has the shape of a frustum of a cone and, when viewed in transversal section as shown on FIG. 2, inclines inwardly with respect of the container 1, with a draft angle.

The cone shape of the inner portion 12 provides a vault stiffening and locking function to the diaphragm 9 in its inverted position (shown in FIG. 4), whereby the restriction of diameter of the inner portion 12 at its junction with the diaphragm 9 prevents the latter to articulate back from its inverted position with respect of the inner portion 12. As a result, re-inversion of the diaphragm 9 back to its initial outwardly-inclined position under the mere hydrostatic pressure of the poured product is prevented.

The inner portion 12 has an axial extension which is important with respect of the outer diameter of the support flange 11, hence the expression "high standing ring" to name the standing ring 8. More specifically, the axial extension (or height) of the inner portion 12 is greater than $\frac{1}{10}$ of the outer diameter of the support flange 11, and preferably comprised between $\frac{1}{10}$ and $\frac{1}{5}$ of the outer diameter of the support flange 11.

In the blown (and filled) configuration of the container 1 depicted on FIG. 1 and FIG. 2, the invertible diaphragm 9 extends outwards in a frustoconical shape from a outer edge 13 where the diaphragm 9 connects to an upper end of the inner portion 12, to an inner edge 14 where the diaphragm 9 connects to a central upwardly protruding recess 15.

Also in the blown configuration of the container 1, the axial extension, or height, of the diaphragm 9, is such that the inner edge 14 of the diaphragm 9 extends slightly above support plane defined at the junction between the support flange 11 and the lower end portion 10 of the sidewall 5. In other words, the height of the diaphragm 9 is slightly lower than the height of the high standing ring 8.

After the container 1 has been blow molded, it is filled through its opening 3 with a (preferably hot) pourable product 16 (shown by a dotted pattern in FIG. 1 to FIG. 4), the diaphragm 9 remaining in its lower position.

Then the container 1 is closed at its neck 2 with a cap 17 which is forced down and screwed onto the neck 2.

The filled and capped container 1 may then undergo a cooling step for recovering an average atmospheric temperature, e.g. of about 20° C.

Then, the container 1 is submitted to a diaphragm inversion, whereby the diaphragm 9 is moved from its lower position to its upper position.

Diaphragm inversion is conducted by a container processing machine 18 which may be a stand-alone machine but which, in a preferred embodiment, is part of a container labeling machine configured for applying a label on the sidewall 5 of each container 1. As the present description is centered on the diaphragm inversion, the whole labeling machine will not be disclosed.

The processing machine 18 may comprise a carrousel rotatably mounted on a fixed support structure, such carrousel including a plurality of identical peripheral processing units 19 displaced along a circular path.

Since processing units 19 are identical, only one will be disclosed in detail hereinafter for the sake of clarity and simplicity.

The processing unit 19 comprises a container supporting frame 20 including a hollow support ring 21 for engaging a container base 7. In the depicted example, the support ring 21 has an annular plate 22 and a tubular outer wall 23, whereby plate 22 and outer wall 22 together form a counter print of at least the support flange 11 and the lower end portion 10 of the container sidewall 5.

The processing unit 19 further includes a container retaining member 24 for rigidly retaining the container 1 in vertical position with its base 7 located within the support ring 21 while the diaphragm 9 is being inverted.

In the depicted example, the retaining member 24 is provided with a conical head 25 suitable for vertically coming into abutment with the cap 17 along the container axis X.

The processing unit 19 further includes a mechanical pusher 26 movable with respect of the supporting frame 20, capable of coming into abutment with the container base 7 through the supporting frame 20 for inverting the diaphragm 9.

More precisely, the pusher 26 is slidingly displaceable along axis X for coming into abutment within the central recess 15, as depicted in FIG. 3 and FIG. 4. In one embodiment depicted in the drawings, the pusher 26 has a tip 27 which is complementary in shape to the central recess 15, but the tip 27 may be of a simpler shape, such as a cylinder.

The processing unit 19 further includes an actuator 28 for slidingly moving the pusher 26 frontwards (i.e. upwards) towards the container base 7 through the supporting frame 20 in order to achieve inversion of the diaphragm 9, and backwards (i.e. downwards) thereafter, to be ready for another inversion cycle.

The processing unit 19 also includes a strain gauge 29 coupled to the actuator 28 for gauging a strain applied by the actuator 28 to the pusher 26 during the diaphragm inversion phase.

The processing unit 19 further includes an electronic control unit 30 comprising a memory 31 and a processor 32.

The memory 31 is implemented with at least one predetermined strain reference value. The processor 32 is connected to the strain gauge 29 and is implemented with a calculation program including instructions for comparing a gauged strain value to the memorized strain reference value.

The term "strain" may refer to a mechanical strain (as expressed in Newton). In that case, the term "strain gauge" may directly refer to a mechanical strain gauge, e.g. a deformable electrical conductor connected to an electrical circuit, an output voltage of which is measured to gauge the resistance variations of the conductor.

The term "strain" may also refer to a pressure (as expressed e.g. in Pascal or Psi). In that case, the term "strain gauge" may refer to a pressure gauge. One should keep in mind that mechanical strain and pressure are linked since a pressure is a mechanical strain by unity of surface. It should also be noted that mechanical strain gauges are commonly used for building pressure gauges.

In a preferred embodiment, by "strain" it is referred to a pressure and the strain gauge 29 is a pressure gauge.

More precisely, in the depicted example it can be seen that the actuator 28 is a hydraulic or pneumatic cylinder, preferably of the two-way type.

The cylinder 28 has a cylinder housing 33, a piston 34 and a rod 35 fixed to the piston 34, with the pusher 26 mounted onto the rod 35. In the depicted example, the pusher 26 is integral with the rod 35, but in an alternate embodiment the pusher 26 may be fixed (e.g. screwed) to a distal end of the rod 35.

In a known manner, the cylinder 28 has a closure head 36 and a closure bottom 37 connected through the housing 33. The piston 34 defines within the cylinder 28 a front chamber 38 around the rod 35 and a back chamber 39 opposite to the rod 35, whereby the front chamber 38 is mainly defined between the piston 34 and the closure head 36 whereas the back chamber is mainly defined between the piston 34 and the closure bottom 37.

As depicted in FIG. 2, the back chamber 39 is in fluidic connection, through a bottom fluid port 40 formed in the closure bottom 37, with a directional control valve (DCV) 41 linked to a source 42 of fluid (such as air or oil) under pressure.

The strain gauge (i.e., in the depicted example, the pressure gauge) 29 is mounted in the cylinder 28 so as to open in the back chamber 39 in order to gauge the fluid pressure (hereinafter referred to as Pb) within the back chamber 39.

In a preferred embodiment, the front chamber 38 is also in fluidic connection, through a front fluid port 43, to the DCV 41 (which is here of the 5/2 type: 5 ports, 2 spool positions), preferably through a flow restrictor 44. This allows for a speed regulation of the piston 34 (and hence the pusher 26) during actuation, i.e. during inversion of the diaphragm 9.

In operation, the container 1 having its diaphragm 9 is the lower position is first filled with the product 16, and then capped. The container 1 is normally not fully filled, so that an empty volume (also called headspace) 45, in which air (or another gas such as nitrogen) remains between the product 16 and the cap 17. Depending upon the reliability of the filling machine, the volume of poured product 16 may vary from one container 1 to another. As a consequence, the headspace 45 may also vary from one container 1 to another, although the headspace 45 should always be substantially equal in volume to a reference headspace 45 corresponding to the correct volume of dispensed product.

During inversion of the diaphragm 9, the product 16, which is virtually incompressible, is displaced upwardly, whereby the gas (generally air) enclosed in the headspace 45 is compressed by a volume substantially equal to the volume (so-called extraction volume) swept by the diaphragm 9 during its inversion, between its lower and upper positions.

It has been witnessed that the mechanical resistance exerted onto the pusher 26 by the diaphragm 9 during its inversion mostly (if not essentially) depends upon the volume of the headspace 45. Therefore, any difference between the gauged strain applied to the pusher 9, and a predetermined reference strain value corresponding to a reference container filled with a proper volume of product (and hence having a reference headspace), may be used to reveal a defect in the actual container 1 the diaphragm 9 of which is being inverted (or has just been inverted, considering the delay for processing information provided by the gauge 29).

The defect may be of several types:
the volume of product 16 within the container 1 is greater than the required (or reference) volume—which results in the headspace 45 having a volume which is lower than a reference headspace volume corresponding to the reference volume of product; in such case, the strain applied to the pusher 26 is higher than the reference strain;
the volume of product 16 within the container 1 is lower than the required (or reference) volume—which results in the headspace 45 having a volume which is greater than a reference headspace volume corresponding to the reference volume of product; in such case, the strain applied to the pusher 26 is lower than the reference strain;
cap 17 has a leak, which results (considering that the actual headspace volume corresponds to the reference headspace volume) in the strain applied to the pusher 26 being also lower than the reference strain.

The strain (here the pressure in the back chamber 39) applied to the pusher 26 is gauged by means of the strain gauge 29 and a gauged point based on the gauged strain value provided by the gauge 29 is memorized by the control unit 30 in memory 31. The gauged point may actually be the gauged strain value, but in a preferred embodiment the gauged point is a couple of values including both the gauged strain value and the instant where this gauged strain value is provided by the gauge 29.

The gauged point is then compared to a memorized predetermined reference point. When a strain point is a couple of values including a strain value and a corresponding instant, the gauged strain value is compared to the memorized reference strain value and the gauged instant is compared to a reference instant.

In a preferred embodiment, the strain applied to the pusher 26 is periodically gauged (preferably with a period shorter than 10 ms, for example of about 5 ms), and the gauged strain values are therefore periodically (here real-time) memorized by control unit 30 in memory 31.

Figure 5:
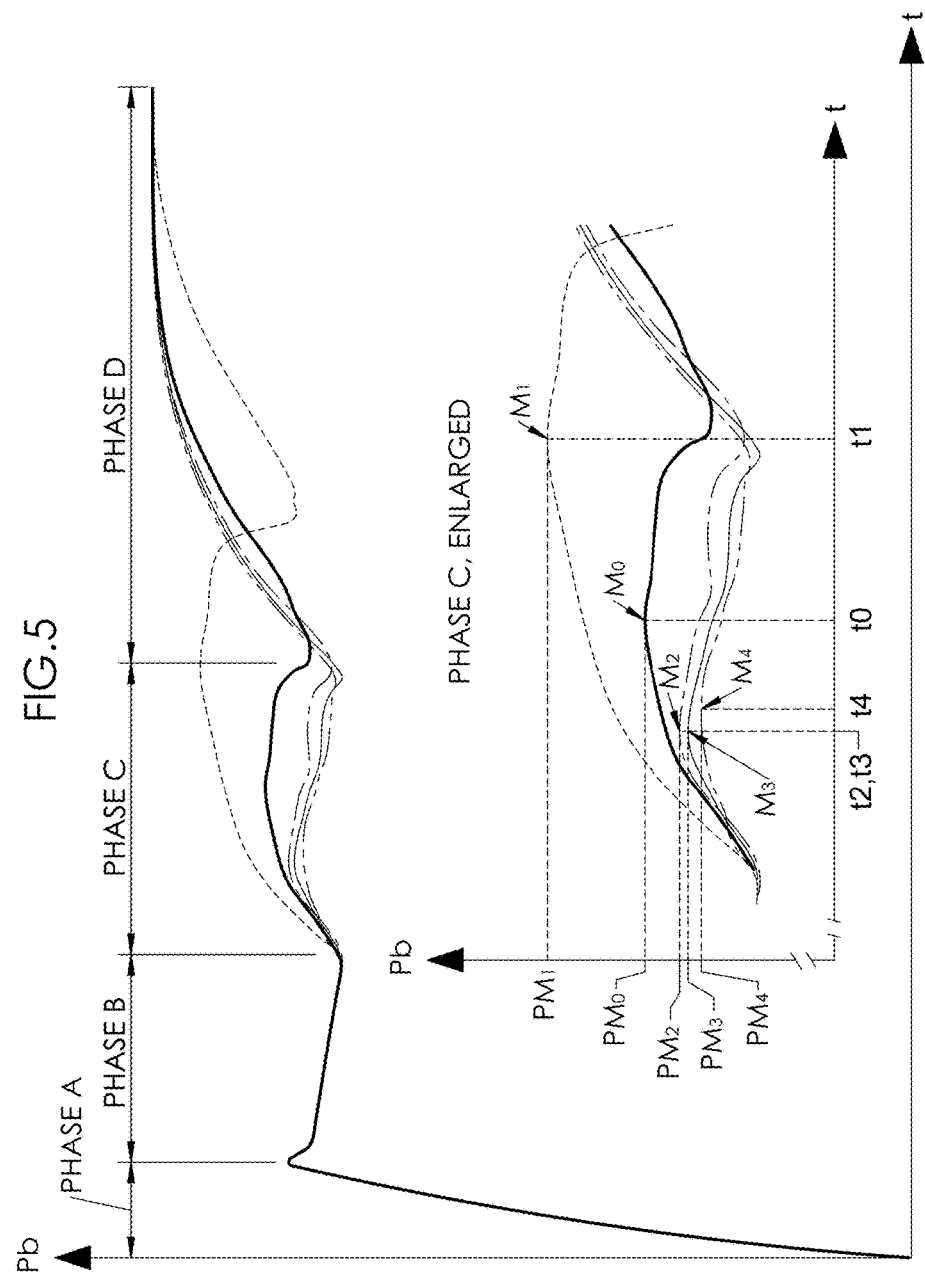
FIG. 5 is a diagram whereon several curves are plotted, illustrating variations of strain applied to the pusher for inverting the diaphragm of various containers.

FIG. 5 shows different examples of strain curves plotted with strain (here, pressure Pb) as ordinate and time (t) as abscissa. The time axis extends from an origin corresponding to a retracted position of the pusher 26 (as depicted on FIG. 1) to a time limit corresponding to an expanded position of the pusher 26 (as depicted on FIG. 4).

The bold curve shows variations in strain applied to the pusher 26 for a reference container having the proper volume of poured product (and hence the proper headspace volume), with no leak in the cap.

The curve shows four main phases.

Phase A, so-called free rise phase, corresponds to the free movement of the pusher 26 before it hits the container base 7. Pressure Pb in the back chamber 39 increases as the fluid is progressively injected therein by the DCV 41.

Phase B, so-called spring phase, corresponds to the diaphragm 9 absorbing (with a spring effect) part of the energy provided by the pusher 26, whereby the pressure Pb in the back chamber 39 slightly decreases from a peak corresponding to the contact between the pusher and the central recess 15.

Phase C, so-called inversion phase, corresponds to the actual inversion of the diaphragm 9, whereby pressure Pb in the back chamber 39 increases to a maximum $M_0$ ($PM_0$, $t_0$), then decreases to a minimum.

Phase D, so-called stabilization phase, corresponds to the arrival of the pusher 26 at an end position where it abuts against the closure head 36, while the diaphragm 9 is already in its upper position.

The dashed curve corresponds to a container with no headspace, denoting an overfilling.

The chain dotted curve corresponds to a container having a cap leakage, denoting a cap defect or a capping failure.

The fine continuous curve corresponds to a container filled with a product at an insufficient volume, i.e. lower than the required volume in the reference container, denoting a filling error.

The double-chain dotted curve corresponds to an empty container, denoting a filling failure.

As may be noted from FIG. 5, the curves show no difference in free rise phase A and spring phase B, wherein the curves are as one.

Differences arise in inversion phase C, which is shown in greater detail in the lower part of FIG. 5.

It can be seen that, although the overall shape of the curves are similar, they differ by the amplitudes of their variations. In particular, the curves show distinct maxima, both in strain value (ordinate) and instant (time).

In FIG. 5, the maxima points are respectively denoted as follows:
M1 ($PM_1$, $t_1$): dashed curve (no headspace),
M2 ($PM_2$, $t_2$): chain dotted curve (cap leakage),
M3 ($PM_3$, $t_3$): fine continuous curve (filling error),
M4 ($PM_4$, $t_4$): double chain dotted curve (filling failure).

Therefore, the local maximum reached by the strain applied to the pusher 26 during the inversion phase C may be regarded as a critical point for the whole process, denoting a drift with respect of the reference container.

Therefore, in a preferred embodiment, the local maximum point Mi (so-called gauged critical point, with i≠0) is detected (in practice by processor 32, which is programmed in consequence) among the memorized gauged points (forming a whole curve) and compared to the memorized maximum $M_0$, i.e. the corresponding gauged strain value Mi (gauged critical strain value) is compared to the corresponding reference strain value $M_0$ (reference critical strain value), and the corresponding instant ti (gauged critical instant) is compared to the reference instant $t_0$ (reference critical instant).

It is to be noted that the gauged critical point Mi may easily be detected within the curve or among the gauged points. Indeed, the inversion phase C may first be isolated from the other phases since it is limited by two minimum values at its junction with spring phase B and stabilization phase B, respectively. Then, the gauged critical point Mi may be isolated since it has, among the memorized gauged points forming inversion phase C, the highest strain value (ordinate).

The gauged critical point Mi may be declared (in practice by processor 31) either:
  equal to the reference critical point $M_0$ if both the gauged critical strain value PMi is substantially equal to the reference critical strain value $PM_0$ (possibly with a tolerance interval) and the gauged critical instant ti is substantially equal to the reference critical instant $t_0$ (possibly with a tolerance interval as well),
  different from the reference critical point $M_0$ if either (or both) the gauged critical strain value PMi and the gauged critical instant ti is (are) different (i.e. beyond the tolerance interval if any) from the reference critical strain value $PM_0$ and reference critical instant $t_0$, respectively.

In case the gauged critical point Mi is declared different from the reference critical point $M_0$, a warning signal might be generated (in practice by processor 31), and possibly displayed on a graphic user interface. In an alternate or combined embodiment, the machine 18 may be stopped after a series of containers have been declared different from the reference container, denoting a problem in the filling (including the capping) process, whichever the cause. In another alternate or combined embodiment, the container 1 is ejected from the machine 18 by a suitable arrangement including e.g. a radial pusher. In such case, a basket is preferably located aside the machine 18 to receive the ejected container 1.

Accordingly, it is possible to detect a defect with the filling process in a simple yet effective manner. In particular, any improper filling or cap leakage may be detected (depending of course of the precision of the comparison achieved between the gauged critical values and the reference ones).

The risk of badly filled containers and containers having a cap leakage being packaged to be sold is therefore reduced, if not prevented.

Various alternate embodiments may be provided within the scope of the present disclosure.

For instance, the hydraulic or pneumatic actuator 28 may be replaced by an electric or magnetic actuator, including an electric or magnetic motor. In this case, the gauged strain may be the torque applied by the actuator to the pusher 26, and the gauge used may therefore be a torque sensor.

In an alternate embodiment, whichever the technology used in the actuator 28, the strain is not gauged within the actuator, but on the retaining member 24, e.g. by means of a mechanical strain gauge. The resulting gauged strains are not different from the ones gauged in the actuator, since by virtue of the laws of mechanics the strain applied to the pusher 26 (and hence to the container 1) is balanced by the reaction of the retaining member 24.

In addition, displacement of the pusher 26 (in the hydraulic or pneumatic or in any other technology such as electric or magnetic) may also be gauged, e.g. by means of an optical (such as a laser) telemeter.

Gauging the displacement of the pusher 26 may, in connection with a time gauge, allow for detecting some container incidents, such as an overfilled container in case the diaphragm 9 would not invert under the mere strain applied by the pusher 26.

The invention claimed is:

1. Method for processing a container (1) provided with:
  a sidewall (6),
  a neck (2) defining an opening (3),
  and a base (7) including a high standing ring (8) and a central invertible diaphragm (9), said diaphragm (9) being deformable with respect of the sidewall (5) between a lower position wherein said diaphragm (9) projects outwardly with respect of the container (1) and an upper position wherein said diaphragm (9) projects inwardly with respect of the container (1),
said method including the steps of:
  filling the container (1) through said opening (3) with a pourable product (16), the diaphragm (9) being in its lower position;
  closing the container (1) at its neck (2) with a cap (17);
  inverting the diaphragm (9) from its lower position to its upper position by means of a movable pusher (26);
wherein said method further includes the steps of:
  gauging a strain applied to the movable pusher (26) while inverting the diaphragm (9);
  memorizing a gauge point (Mi) based on the gauged strain value (PMi);
  comparing the gauged point (Mi) to a memorized predetermined reference point ($M_0$);
  periodically gauging the strain applied to the movable pusher (26) along the diaphragm inversion;
  memorizing the such gauged strain values; and
  detecting, among the memorized gauged points, a gauged critical point (Mi);
  wherein comparing the gauged critical point (Mi) includes comparing a gauged critical strain value (PMi) to a predetermined critical reference strain value ($PM_0$).

2. Method according to claim 1, wherein gauging the strain applied to the movable pusher (15) is achieved with a period shorter than 10 ms.

3. Method according to claim 1, wherein comparing the critical gauged point (Mi) includes comparing a gauged critical instant (ti) to a predetermined reference critical instant (t0).

4. Method according to claim 1, further including the step of generating a warning signal if the gauged strain value is declared different from the reference strain value.

5. Method according to claim 1, further including the step of ejecting the container (1) if the gauged strain value is declared different from the reference strain value.

6. Method according to claim 1, wherein the pusher (26) is mounted onto a movable rod (35) of a hydraulic or pneumatic cylinder (28), wherein the rod (35) is fixed to a piston (34) which defines within the cylinder (28) a front chamber (38) around the rod (35) and a back chamber (39) opposite to the rod (35), wherein said back chamber (39) is in fluidic connection with a source (42) of fluid under pressure, wherein the step of determining the effective strain applied to the pusher (26) comprises measuring a fluidic pressure within the back chamber (39).

7. Method according to claim 1, including a step of filling the container (1) with a hot pourable product (16), and further including, between the steps of closing the container (1) and inverting the diaphragm (9), a step of cooling the container (1).

8. Method according to claim 1, further including a step of gauging a displacement of the pusher (26).

9. Method for processing a container (1) provided with:
a sidewall (6),
a neck (2) defining an opening (3),
and a base (7) including a high standing ring (8) and a central invertible diaphragm (9), said diaphragm (9) being deformable with respect of the sidewall (5) between a lower position wherein said diaphragm (9) projects outwardly with respect of the container (1) and an upper position wherein said diaphragm (9) projects inwardly with respect of the container (1),
said method including the steps of:
filling the container (1) through said opening (3) with a pourable product (16), the diaphragm (9) being in its lower position;
closing the container (1) at its neck (2) with a cap (17);
inverting the diaphragm (9) from its lower position to its upper position by means of a movable pusher (26);
wherein said method further includes the steps of:
gauging a strain applied to the movable pusher (26) while inverting the diaphragm (9);
memorizing a gauge point (Mi) based on the gauged strain value (PMi);
comparing the gauged point (Mi) to a memorized predetermined reference point ($M_0$);
periodically gauging the strain applied to the movable pusher (26) along the diaphragm inversion;
memorizing the such gauged strain values; and
detecting, among the memorized gauged points, a gauged critical point (Mi);
wherein comparing the critical gauged point (Mi) includes comparing a gauged critical instant (ti) to a predetermined reference critical instant (t0).

10. Method according to claim 9, wherein gauging the strain applied to the movable pusher (15) is achieved with a period shorter than 10 ms.

11. Method according to claim 9, further comprising the step of generating a warning signal if the gauged strain value is declared different from the reference strain value.

12. Method according to claim 9, further comprising the step of ejecting the container (1) if the gauged strain value is declared different from the reference strain value.

13. Method according to claim 9, wherein the pusher (26) is mounted onto a movable rod (35) of a hydraulic or pneumatic cylinder (28), wherein the rod (35) is fixed to a piston (34) which defines within the cylinder (28) a front chamber (38) around the rod (35) and a back chamber (39) opposite to the rod (35), wherein said back chamber (39) is in fluidic connection with a source (42) of fluid under pressure, wherein the step of determining the effective strain applied to the pusher (26) comprises measuring a fluidic pressure within the back chamber (39).

14. Method according to claim 9, comprising a step of filling the container (1) with a hot pourable product (16), and further including, between the steps of closing the container (1) and inverting the diaphragm (9), a step of cooling the container (1).

15. Method according to claim 9, further comprising a step of gauging a displacement of the pusher (26).

* * * * *